United States Patent
Lakshmanan et al.

(10) Patent No.: US 7,260,803 B2
(45) Date of Patent: Aug. 21, 2007

(54) INCREMENTAL DUMMY METAL INSERTIONS

(75) Inventors: Viswanathan Lakshmanan, Thorton, CO (US); Richard Blinne, Fort Collins, CO (US); Vikram Shrowty, Fremont, CA (US); Lena Montecillo, Los Gatos, CA (US)

(73) Assignee: LSI Corporation, Milpitas, CA (US)

( * ) Notice: Subject to any disclaimer, the term of this patent is extended or adjusted under 35 U.S.C. 154(b) by 739 days.

(21) Appl. No.: 10/683,369

(22) Filed: Oct. 10, 2003

(65) Prior Publication Data

US 2005/0080607 A1    Apr. 14, 2005

(51) Int. Cl.
*G06F 17/50* (2006.01)
*G06F 19/00* (2006.01)

(52) U.S. Cl. .............. 716/10; 716/21; 716/5; 700/97; 700/103; 700/105; 700/120; 700/121

(58) Field of Classification Search .......... 716/10, 716/21, 5; 700/97, 98, 103, 105, 120, 121
See application file for complete search history.

(56) References Cited

U.S. PATENT DOCUMENTS

| | | | | |
|---|---|---|---|---|
| 5,597,668 A * | 1/1997 | Nowak et al. | | 430/5 |
| 5,970,238 A * | 10/1999 | Shibata et al. | | 716/8 |
| 6,516,457 B1 * | 2/2003 | Kondou | | 716/8 |
| 6,574,789 B1 * | 6/2003 | Yamauchi | | 716/21 |
| 6,718,527 B2 * | 4/2004 | Li | | 716/5 |
| 6,751,785 B1 | 6/2004 | Oh | | |
| 6,815,811 B2 | 11/2004 | Ozawa et al. | | |
| 6,892,363 B2 * | 5/2005 | Li | | 716/2 |
| 7,007,259 B2 * | 2/2006 | Shrowty et al. | | 716/10 |
| 7,137,092 B2 * | 11/2006 | Maeda | | 716/8 |
| 2001/0011362 A1 * | 8/2001 | Yoshinaga | | 716/8 |
| 2002/0066067 A1 * | 5/2002 | Wang et al. | | 716/11 |
| 2002/0138817 A1 * | 9/2002 | Lee et al. | | 716/12 |
| 2002/0185664 A1 * | 12/2002 | Dixit et al. | | 257/211 |
| 2003/0204832 A1 * | 10/2003 | Matumoto | | 716/19 |
| 2004/0025125 A1 * | 2/2004 | Li | | 716/5 |
| 2004/0031004 A1 * | 2/2004 | Yoshioka | | 716/7 |
| 2004/0063038 A1 * | 4/2004 | Shin et al. | | 430/311 |
| 2004/0139408 A1 * | 7/2004 | Boluki et al. | | 716/5 |
| 2005/0028121 A1 * | 2/2005 | Shrowty et al. | | 716/10 |
| 2005/0051809 A1 * | 3/2005 | Smith et al. | | 257/232 |
| 2005/0132306 A1 * | 6/2005 | Smith et al. | | 716/1 |
| 2006/0190920 A1 * | 8/2006 | Sakurai et al. | | 716/21 |

* cited by examiner

*Primary Examiner*—Phallaka Kik
(74) *Attorney, Agent, or Firm*—Strategic Patent Group Inc.

(57) ABSTRACT

A method and system for performing dummy metal insertion in design data for an integrated circuit is disclosed, wherein the design data includes dummy metal objects inserted by a dummy fill tool. After a portion of the design data is changed, a check is performed to determine whether any dummy metal objects intersect with any other objects in the design data. If so, the intersecting dummy metal objects are deleted from the design data, thereby avoiding having to rerun the dummy fill tool.

22 Claims, 2 Drawing Sheets

INCREMENTAL DUMMY METAL INSERTIONS

FIELD OF THE INVENTION

The present invention relates to a method inserting incremental dummy metal into an integrated circuit design, and more particularly to a method for performing dummy metal insertion that avoids having to rerun the dummy fill software tool after the integrated circuit design is changed.

BACKGROUND OF THE INVENTION

Chemical Mechanical Polishing (CMP) is a part of the chip fabrication process that requires a uniform distribution of metal and silicon over the surface of the chip. To achieve this distribution, pieces of interconnect (metal or silicon) must be inserted into available spaces in low-density regions of the chip. This interconnect insertion is called dummy metal filling or simply dummy filling, and the inserted interconnect is called dummy metal. Dummy metal is typically not allowed to touch or otherwise intersect with any objects in the design.

Most fabrication processes require a minimum density for the interconnects on each layer of a multi-layer chip design. The interconnect density for a region is the sum total of the area of all interconnects in that region divided by the area of the region. Fabrication processes typically partition each layer of the design into rectangular regions, called tiles, and specify that the interconnect density of each tile meet a minimum density requirement.

The process of determining the number and placement of dummy metal is typically preformed by a dummy fill software tool after routing and timing closure during chip design flow. The dummy fill tool operates on a design database that stores the design data for the integrated circuit, and determines whether each tile has an interconnect density equal to or greater than the specified minimum density. If the interconnect density does not meet the minimum density, then the dummy fill tool inserts pieces of dummy metal in free regions of the tile.

The time it takes the dummy fill tool to complete its task is dependent upon the complexity of the integrated circuit design, and correspondingly, the size of the design database. For a design of average complexity, the runtime for the dummy fill tool would be approximately 3-4 hours. With today's new process technologies and increasingly complex designs, the dummy fill tool may have a runtime of up to 30 hours.

The problem is that once a design has almost reached completion, a customer may request changes to the design in the form of engineering change orders (ECO). Once implemented, an ECO may change the locations of objects in the design. And even though most ECO make small incremental changes and 99.9 percent of the design may be left unchanged, the results of the dummy fill tool are thrown out, and the dummy fill tool is rerun in order to ensure that no dummy metal intersects with any of the design objects. Requiring another run of the dummy fill tool is problematic because it may delay completion of the design by another 30 hours. In addition, if more than one ECO is received, multiple runs will be required: one for each ECO. Such an iterative process can significantly impact the design schedule and result in cost overruns.

Accordingly what is needed is a method for inserting dummy metal into an integrated circuit design after an ECO without requiring reruns of the dummy fill tool. The present invention addresses such a need.

SUMMARY OF THE INVENTION

The present invention provides a method and system for performing dummy metal insertion in design data for an integrated circuit, wherein the design data includes dummy metal objects inserted by a dummy fill tool. After a portion of the design data is changed, a check is performed to determine whether any dummy metal objects intersect with any other objects in the design data. If so, the intersecting dummy metal objects are deleted from the design data, thereby avoiding having to rerun the dummy fill tool.

According to the method and system disclosed herein, dummy metal objects inserted into design data are preserved prior to implementing change orders that alter the design data, and then reloaded after implementation of the change order except for dummy metal found to intersect with design objects. This eliminates the need to rerun a dummy fill tool after each ECO, and therefore saves time on overall design execution.

DETAILED DESCRIPTION OF THE INVENTION

The present invention relates to a method for adding dummy metal to an integrated circuit design. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
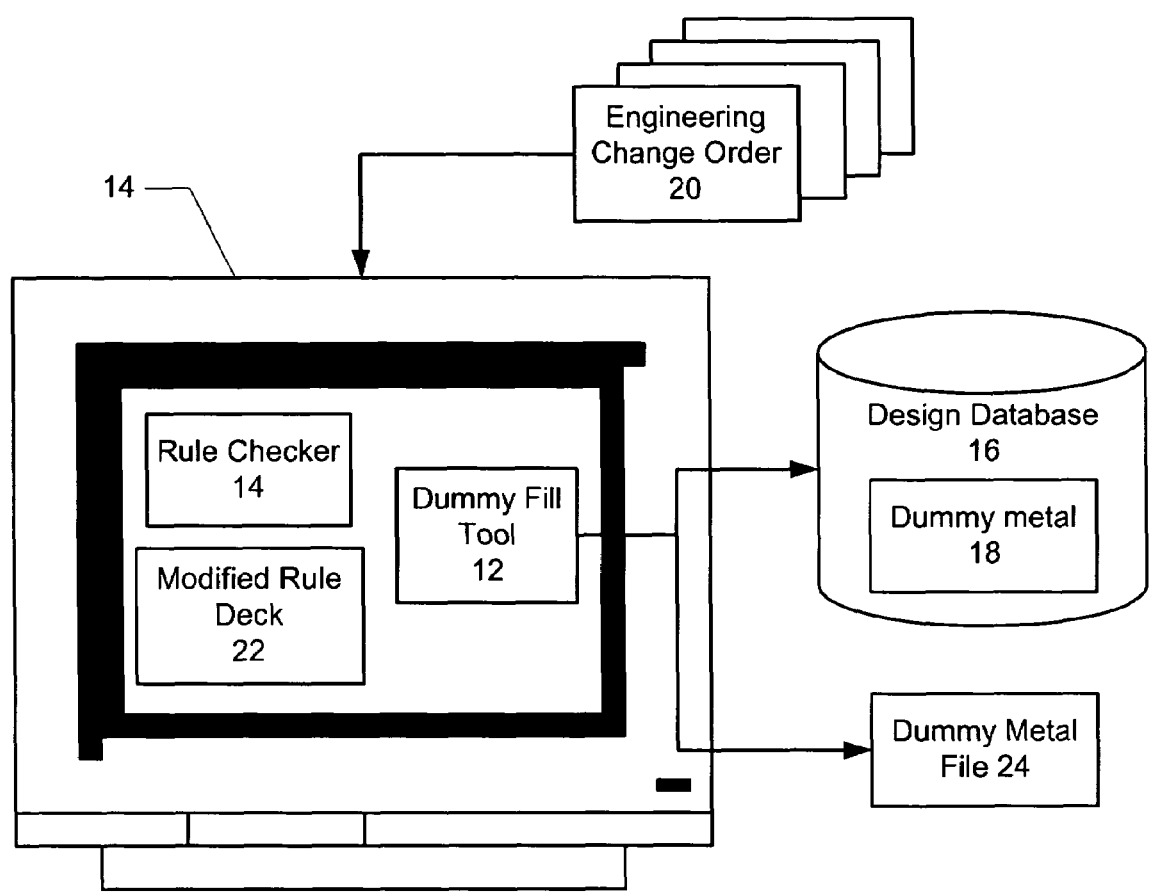
FIG. 1 is a block diagram illustrating a software and hardware environment in which the present invention may be implemented.

The present invention provides a method for performing incremental dummy metal insertion in design data for an integrated circuit design after the design has been changed. FIG. 1 is a block diagram illustrating a software and hardware environment in which the present invention may be implemented. During normal design flow of an integrated circuit, multiple design automation tools executing on one or more computers 14 populate a design database 16 with design data. The design database 16 includes information describing all objects of a fully routed integrated circuit design, such as cells, interconnects, and signal nets. An example of the design database is the Milkyway™ Database by Synopsys of Mountain View, Calif. The design automation tools include a dummy fill application 12 and a rule checker 14. The dummy fill application 12 is typically invoked after routing and timing closure stages of the design flow to insert dummy metal objects 18 into the design database 16 as described above. The rule checker 14 is typically invoked after stream-out to ensure the finished design complies with design rules. In a preferred embodiment, the rule checker tool 14 is an industry-standard DRC checker, such as Mentor Calibre™ and Synopsys Hercules™, for example.

In today's semiconductor industry, customers contract with chip manufacturers to design and produce highly customized integrated circuit designs. During the design flow of a custom integrated circuit design, it is not uncommon for the manufacturer to receive engineering change orders (ECO) 20 from the customer requesting changes to the design. ECOs 20 can be received all the way up to the stream-out phase, where the design database 16 is converted into a file format suitable for actual fabrication. A conventional design flow using a conventional dummy fill tool would require that the dummy fill tool be rerun after each change order was implemented to recompute the dummy metal 18 required for the design, severely impacting aggressive timing schedules.

The present invention provides an improved dummy fill tool 12 and a modified rule deck 22 that dispense with the need to rerun the dummy fill tool 12 after each ECO 20. According to the present invention, the dummy fill tool 12 performs a check after the implementation of each ECO to determine whether any dummy metal objects 18 intersect with any other objects in the design data. Any dummy metal objects 18 determined to be intersecting another object are then deleted from the design database 16, thereby avoiding having to rerun the dummy fill tool 12 after each ECO 20.

Figure 2:
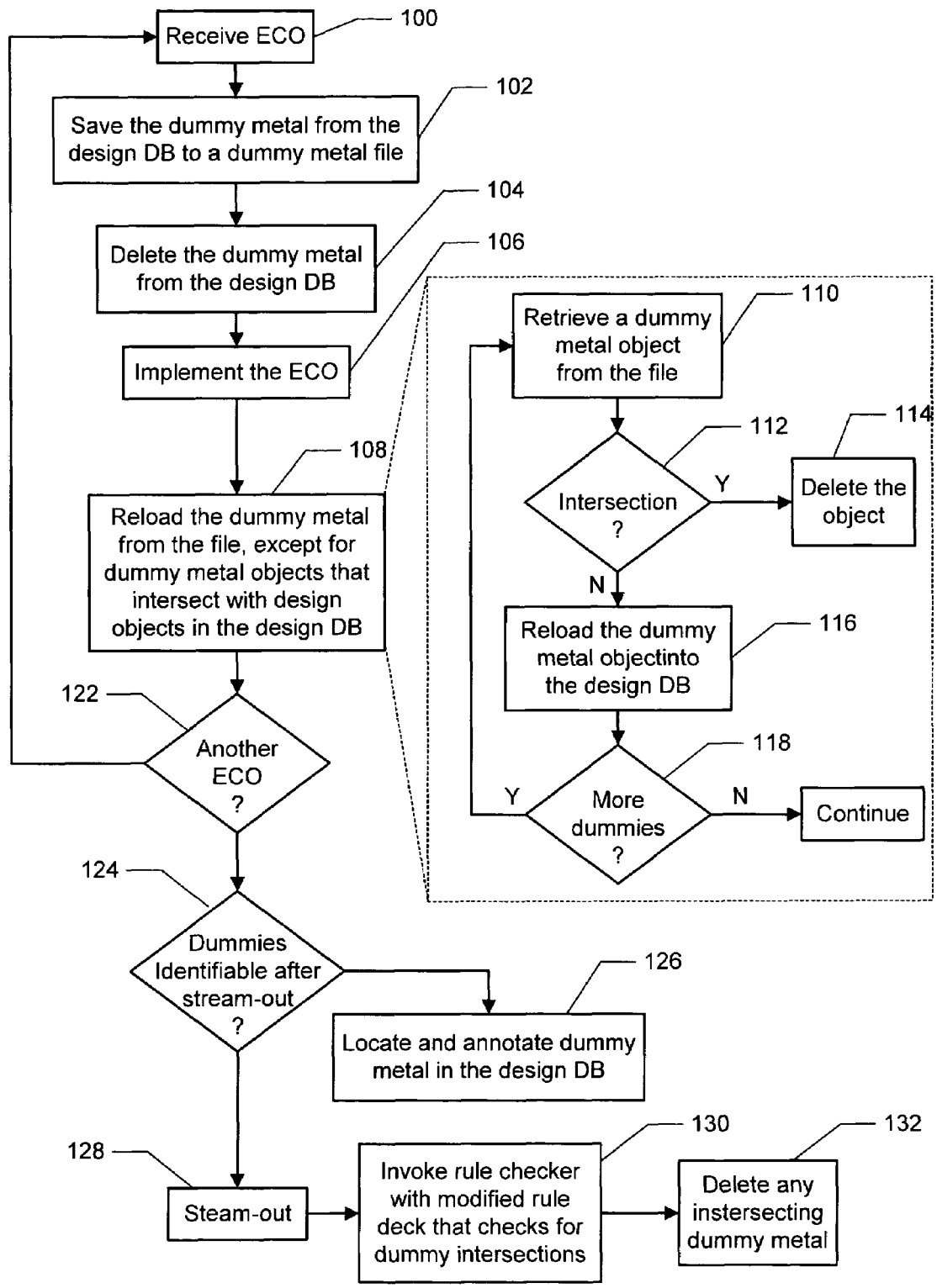
FIG. 2 is a flow diagram illustrating the process for incremental dummy metal insertion performed by the dummy fill application in accordance with a preferred embodiment of the present invention.

FIG. 2 is a flow diagram illustrating the process for incremental dummy metal insertion performed by the dummy fill application 12 in accordance with a preferred embodiment of the present invention. Referring to both FIGS. 1 and 2, the process begins in step 100 after a request to change the design data in the design database 16 is received. In a preferred embodiment, the request is in the form of an ECO 20. Typically, the ECO 20 results in design objects (e.g., wires) being added and/or design object locations being changed. Thus, it is possible that the newly added or rearranged design objects may overlap with, and therefore intersect, previously inserted pieces of dummy metal 18.

To ensure that the design database 16 does not include any such intersections, in step 102, an operator instructs the dummy fill tool 12 to save the dummy metal 18 from the design database 16 to a dummy metal file 24. In step 104, the dummy fill tool 12 deletes all the dummy metal 18 from the design database 16. In step 106, the ECO 20 is implemented and the design database 16 updated.

According to the present invention, after the ECO 20 is implemented in step 108, the dummy fill tool 12 reloads the dummy metal 18 from the dummy metal file 24, except for dummy metal objects 18 that intersect with design objects in the design database 16. The sub-processes performed in step 108 are also shown in FIG. 2.

The process of reloading good dummy metal 18 into the design database 16 begins in step 110 by retrieving a dummy metal object 18 from the dummy metal file 24. In step 112, it is determined whether the dummy metal object 18 intersects with any of the design objects. In a preferred embodiment, each dummy metal object 18 is annotated in the design database 16 with an attribute that identifies it as dummy metal. The dummy metal fill tool intersection detection is accomplished by examining nets of the respective wires, and if a net identified as dummy metal 18 intersects with a net of a different name, then the dummy metal object 18 is deleted from the file 24 in step 114. Otherwise, in step 116, the dummy metal object 18 is reloaded into the design database 16. This checking process is then repeated until there are no more dummy metal objects 18 in the dummy metal file 24, as determined in step 118.

In an alternative embodiment, rather than deleting a dummy metal object 18 identified as intersecting from the file 24, the identified dummy metal 18 may be simply passed over and not reloaded during the reload process. In another alternative embodiment, all dummy metal objects 18 in the file 24 may be examined serially, and those found to be intersecting can be flagged as such in the file 24. A batch reload can then be performed on the file 24 that reloads only the dummy metal objects 18 that are not flagged as intersecting.

As an optional step, after processing the ECO 20, the operator may choose to fix all tiles in the design database 16 that fail the minimum density requirement by using the dummy fill tool 12 to add additional dummy metal at legal locations.

In step 122 is determined whether there is any more ECOs 20 to implement. If so, then, the process continues at step 100. Once all of the ECOs 20 have been implemented, the stream-out process may be performed. However, prior to performing stream-out, in step 124 the dummy fill tool 12 determines whether the metal objects 18 are identifiable as such in the design database 16. This would occur for example, where the dummy fill tool 12 is operating on a design database 16 that was populated with another dummy fill tool that did not identify dummy metal 18, or if certain types of annotations in the design database 16 are not preserved after stream-out. If the dummy metal 18 are not identifiable in the design database 16, then in step 126 the dummy fill tool 12 locates and annotates the dummy metal 18 in the design database 16. According to the present invention, this ensures that all dummy metal 18 will be identifiable after stream-out.

In step 128, a conventional stream-out process is performed in which the design database 16 is converted into a format suitable for the fabrication process. After stream-out, the rule checker tool 14 is invoked in step 130 using the modified rule deck 22 of the present invention to determine whether the output of the stream-out includes any dummy metal objects 18 that intersect with design objects. According to the present invention, the modified rule deck 22 uses the dummy metal annotations in the design database 16 to determine the existence of intersections between dummy metal 18 and other objects. If an intersecting dummy metal object 18 is found, then in step 132 the dummy metal object 18 is deleted.

According to the present invention, the dummy fill tool 12 preserves the dummy metal 18 inserted into design data when ECO's 20 are implemented, which eliminates the need to rerun the dummy fill tool 12 after each ECO 20. The dummy fill tool 12 of the present invention helps integrated circuit manufacturers meet aggressive design schedules even though run-times for inserting dummy metal in large designs can be significant, and therefore saves time on overall design execution.

In an alternative embodiment, the method according to the present invention may be implemented as a script or other type of program that operates on the design database, rather than being implemented in the dummy fill tool 12.

A method for incremental dummy metal insertion has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for performing dummy metal insertion in design data for an integrated circuit, which includes dummy metal objects inserted by a dummy fill tool, comprising:
    (a) after a portion of the design data is changed, performing a check to determine whether any dummy metal objects intersect with any other objects in the design data; and
    (b) deleting the intersecting dummy metal objects from the design data, thereby avoiding having to rerun the dummy fill tool.

2. The method of claim 1 wherein step (a) further includes: prior to implementing the change, saving the dummy metal objects from the design data to a file.

3. The method of claim 2 wherein step (a) further includes: performing the check by accessing the dummy metal objects in the file.

4. The method of claim 3 further including:
    reloading remaining dummy metal objects from the file to the design data.

5. The method of claim 4 wherein step (a) further includes:
    performing the check by on the dummy metal objects in the file by,
        (i) annotating each dummy metal object with an attribute that identifies it as dummy metal, and
        (ii) examining nets of respective wires, and determining if a net identified as dummy metal intersects with a net of a different name.

6. The method of claim 5 wherein step (b) further includes:
    (iii) deleting from the file any net identified as dummy metal that intersects with a net of a different name.

7. The method of claim 5 wherein step (b) further includes:
    (iii) flagging in the file any net identified as dummy metal that intersects with a net of a different name.

8. The method of claim 5 wherein step (c) further includes: not reloading any flagged dummy metal from the file.

9. The method of claim 4 wherein step (a) further includes: changing the portion of the design data by implementing an engineering change order (ECO).

10. The method of claim 9 further including:
    performing a stream-out process;
    invoking a rule checker tool using a modified rule check to determine whether an output of the stream-out includes any dummy metal objects that intersect with design objects; and
    deleting the dummy metal objects that intersect with design objects.

11. The method of claim 10 wherein the modified rule check uses the dummy metal identifications to determine existence of intersections between dummy metal and the design objects.

12. A computer readable medium containing program instructions for performing dummy metal insertion in design data for an integrated circuit, which includes dummy metal objects inserted by a dummy fill tool, the program instructions comprising instructions for:
    (a) after a portion of the design data is changed, performing a check to determine whether any dummy metal objects intersect with any other objects in the design data; and
    (b) deleting the intersecting dummy metal objects from the design data, thereby avoiding having to rerun the dummy fill tool.

13. The computer-readable medium of claim 12 wherein instruction (a) further includes an instruction of: prior to implementing the change, saving the dummy metal objects from the design data to a file.

14. The computer-readable medium of claim 13 wherein instruction (a) further includes an instruction of: performing the check by accessing the dummy metal objects in the file.

15. The computer-readable medium of claim 14 further including an instruction of:
    (c) reloading remaining dummy metal objects from the file to the design data.

16. The computer-readable medium of claim 15 wherein instruction (a) further includes an instruction of: performing the check by on the dummy metal objects in the file by,
    (i) annotating each dummy metal object with an attribute that identifies it as dummy metal, and
    (ii) examining nets of respective wires, and determining if a net identified as dummy metal intersects with a net of a different name.

17. The computer-readable medium of claim 16 wherein instruction (b) further includes an instruction of:
    (iii) deleting from the file any net identified as dummy metal that intersects with a net of a different name.

18. The computer-readable medium of claim 16 wherein instruction (b) further includes an instruction of:
    (iii) flagging in the file any net identified as dummy metal that intersects with a net of a different name.

19. The computer-readable medium of claim 16 wherein instruction (c) further includes an instruction of: not reloading any flagged dummy metal from the file.

20. The computer-readable medium of claim 15 wherein instruction (a) further includes an instruction of: changing the portion of the design data by implementing an engineering change order (ECO).

21. The computer-readable medium of claim 20 further including instructions of:
    (d) performing a stream-out process;
    (e) invoking a rule checker tool using a modified rule check to determine whether an output of the stream-out includes any dummy metal objects that intersect with design objects; and
    (f) deleting the dummy model objects that intersect with design objects.

22. The computer-readable medium of claim 21 wherein the modified rule check uses the dummy metal identifications to determine existence of intersections between dummy metal and the design objects.

* * * * *